June 7, 1966  C. JOHNSON  3,254,675
MULTI-PURPOSE SOLENOID-PILOT VALVE ASSEMBLY
Filed Nov. 19, 1963  4 Sheets-Sheet 1

INVENTOR
CLARENCE JOHNSON

BY *Strauch, Nolan & Neale*

ATTORNEYS

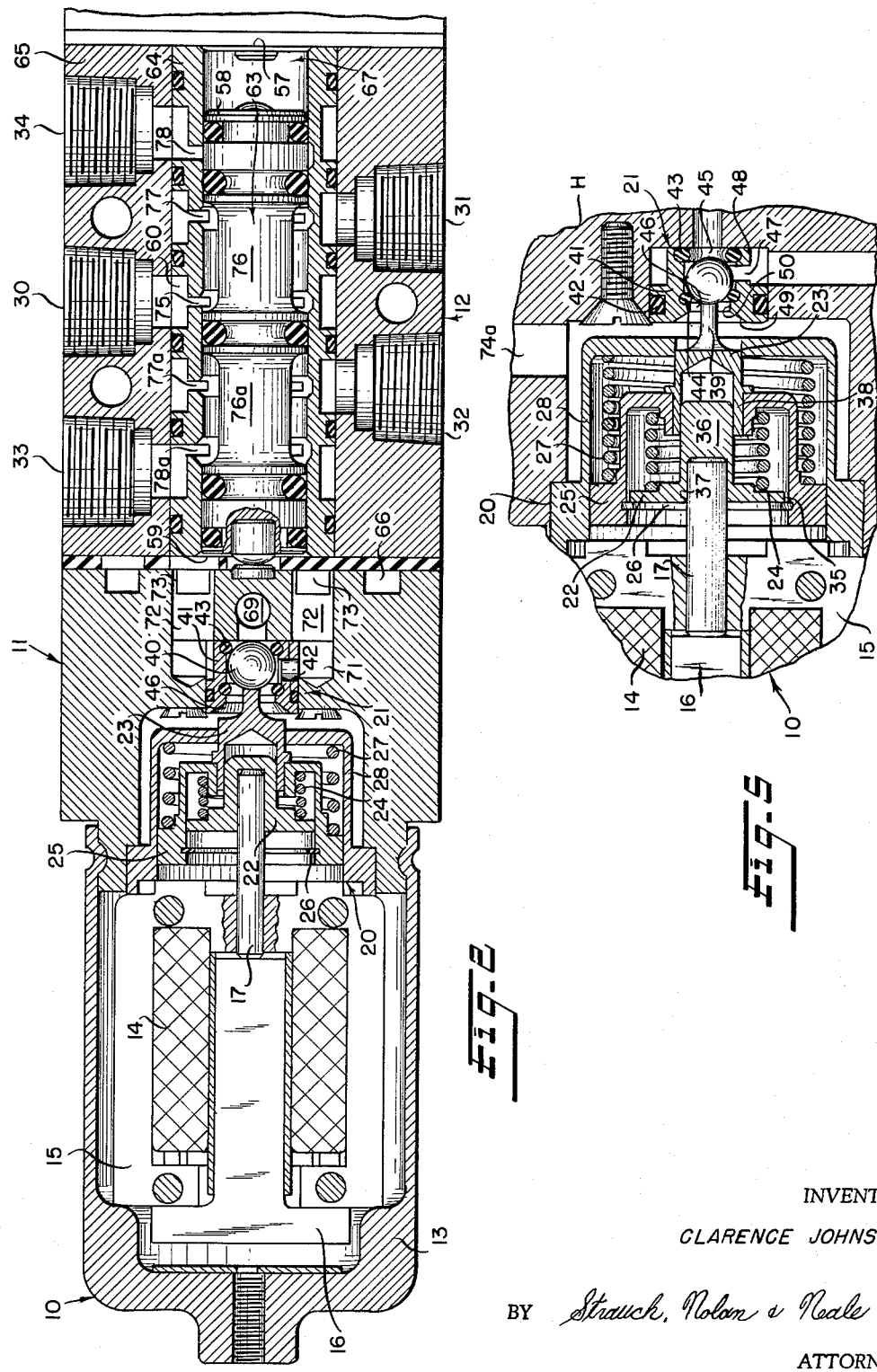

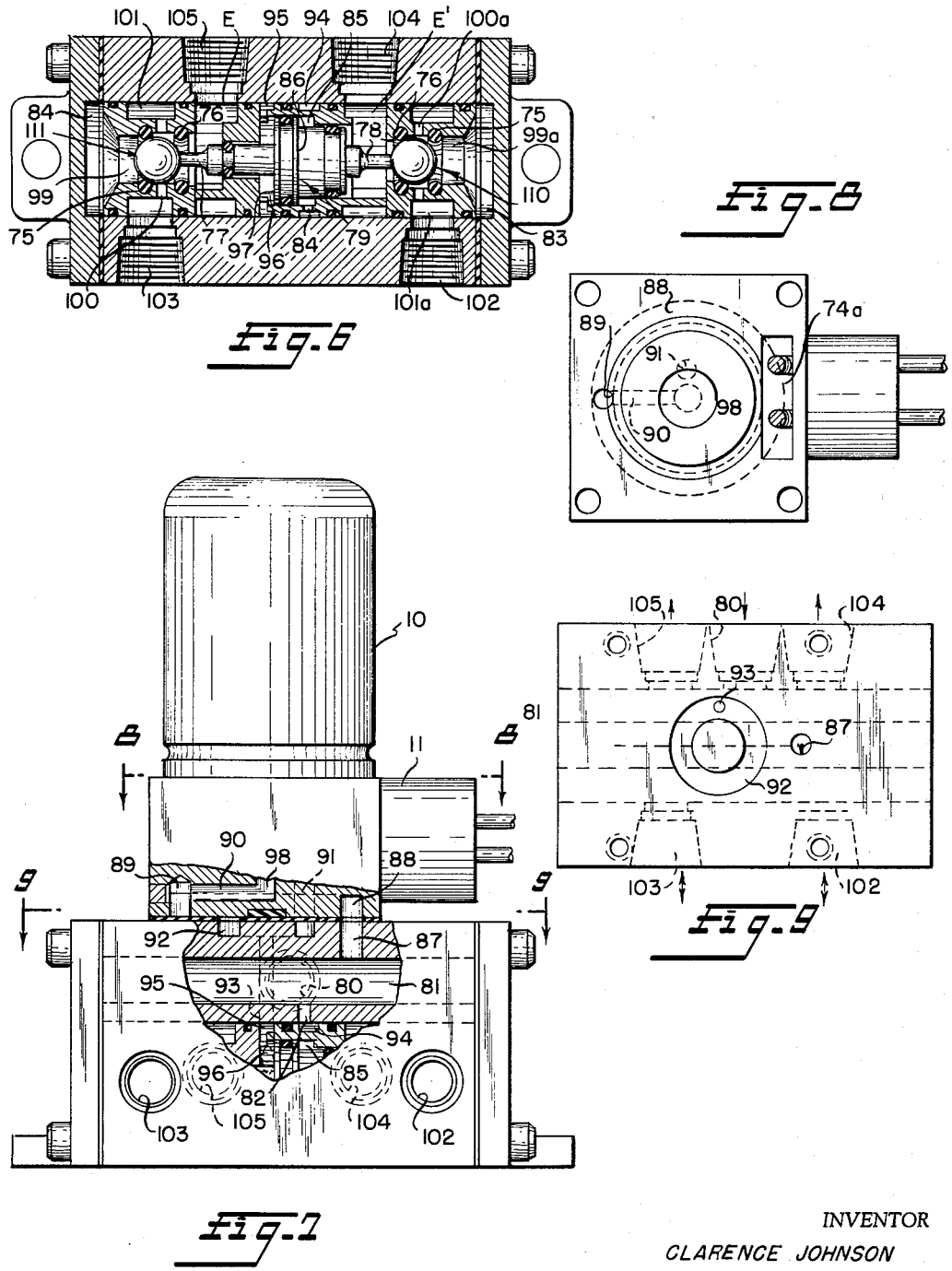

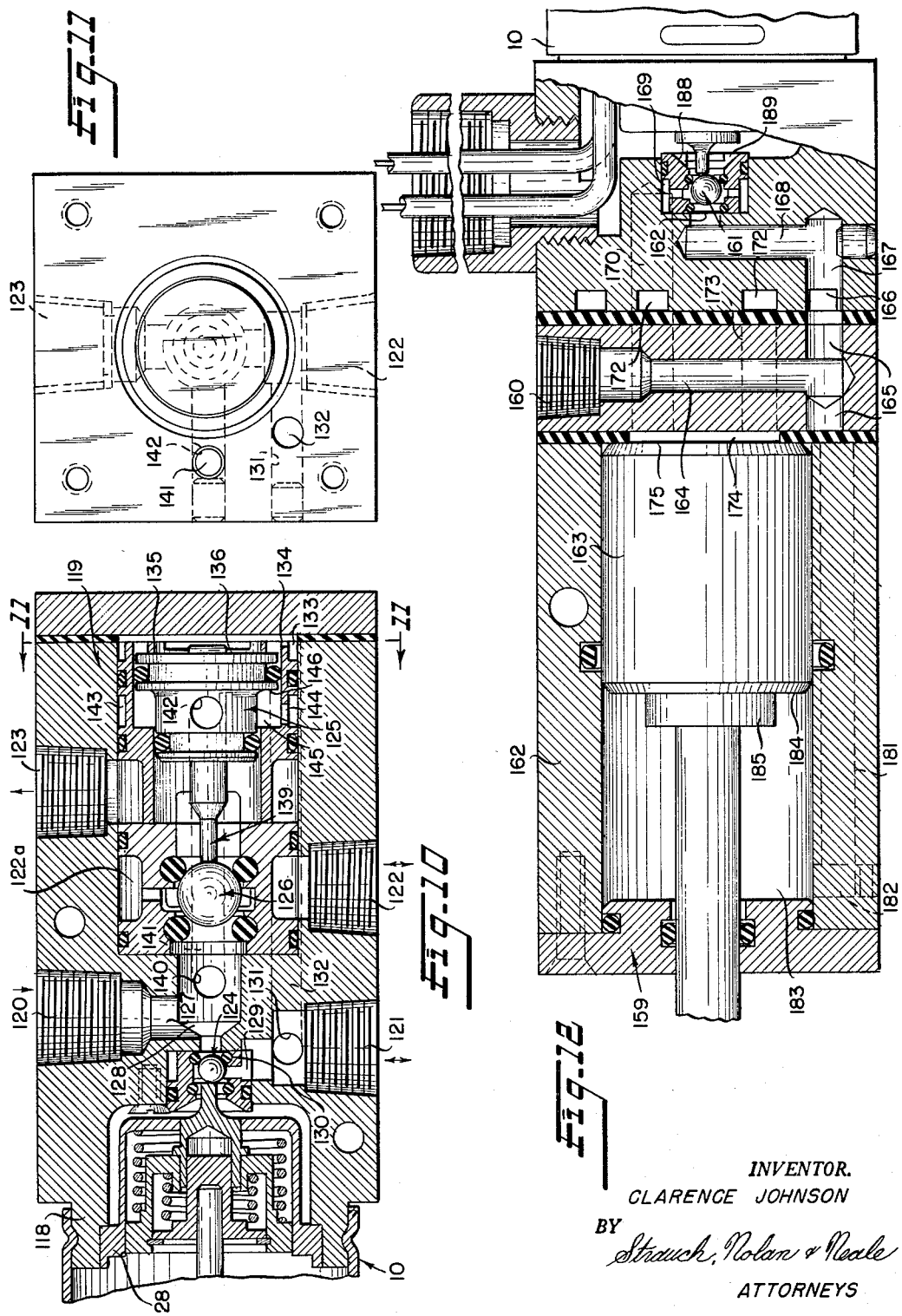

United States Patent Office 3,254,675
Patented June 7, 1966

3,254,675
MULTI-PURPOSE SOLENOID-PILOT
VALVE ASSEMBLY
Clarence Johnson, 31649 Trillium Trail,
Cleveland 24, Ohio
Filed Nov. 19, 1963, Ser. No. 324,729
3 Claims. (Cl. 137—625.65)

The present invention relates to valves and more particularly to solenoid controlled valves adapted for multi-purpose use in conjunction with servo-motors.

Difficulty has been encountered in the past in producing a solenoid valve assembly which allows the solenoid to complete its full travel stroke, thus averting burn-out, and at the same time controlling the force and displacement urged upon the actuated valve. Solenoid induced impacts and displacements greater than that required to actuate the associated valve have caused manufacturers to over-design commercial valves to withstand these excessive loads, resulting in valves having low fluid capacity. Early replacement of fragile parts of the valve is often required, sometimes before use after prolonged storage, due to loads imposed during storage. The solenoid valve assemblies of the past have proved unsuitable to accommodate both solenoid long life and long life of the valve.

It is the principal object of the present invention to provide a valve assembly having sufficient fluid capacity to permit its use as a control device in a multiplicity of applications.

A further object of the present invention is to provide a solenoid valve assembly wherein full, substantially unrestrained travel of the armature of a low-cost solenoid is achieved to avoid burn-out thereof, while at the same time the solenoid input into the valve is selectively controlled.

It is another object of the present invention to selectively control the operating force allowed to be impinged upon a valve to substantially the amount of force required to actuate the valve.

It is a further object of the present invention to provide a solenoid-actuator-pilot valve assembly wherein the actuator has an overriding mechanism which selectively controls the amount of solenoid force to be imparted to the pilot valve.

It is a further object of the present invention to provide a solenoid-actuator valve assembly wherein full, substantially unrestrained travel of the solenoid armature is achieved (to avoid burn-out) and wherein the actuator has an overriding mechanism which receives the full force and travel stroke of the solenoid and selectively controls the force and displacement imparted to the valve.

It is still another object of the present invention to avert damage to the resilient seat members, usually O-rings, of the control valve by limiting the force exerted thereon.

Another object of the present invention is, by virtue of the above stated controlled input, to reduce the factor of safety used to design the control valve and consequently to provide a larger fluid passage area; thus producing a high fluid capacity valve. The high fluid capacity markedly enlarges the scope of use to which the control valve may be put.

Another object of the present invention is to create a solenoid valve assembly whereby the armature and the valve are relaxed during storage, to avert damage to the more fragile parts of the valve; so that, regardless of the length of storage, the assembly is always ready for instant use without replacement of damaged parts.

Still another object is to provide a novel solenoid valve unit which is removable and replaceable and also is self-sealing once installed.

A further object is to provide resilient actuator to repeated loads and thereafter to transmit substantially a constant portion of the repeated loads.

A further object is to provide a resilient actuator to receive repeated displacement loads and thereafter transmit substantially a constant portion of the displacement and of the repeated loads.

These and other objects and advantages of the instant invention will be apparent to those conversant with the art from a reading of the following description and appended claims in conjunction with the annexed drawings in which:

FIGURE 2 is a longitudinal sectional view of the left portion of the embodiment shown in FIGURE 1;

FIGURE 5 is an enlarged fragmentary sectional view of the solenoid-pilot valve embodiment of FIGURE 2;

FIGURE 6 shows another type of pilot valve-spool valve assembly in longitudinal section view;

FIGURE 7 is an elevation view in fragmentary section with part of the main spool omitted to show the flow path of the fluid through the pilot valve-spool valve assembly of FIGURE 6;

FIGURE 8 is an elevational view taken along lines 8—8 of FIGURE 7;

FIGURE 9 is an elevational view taken along lines 9—9 of FIGURE 7;

FIGURE 10 is a longitudinal sectional view of the invention applied directly to a routing valve provided in a spool valve assembly;

FIGURE 11 is an elevational view taken along lines 11—11 of FIGURE 10;

FIGURE 12 is a longitudinal sectional view of another application of the instant invention directly controlling a servo-motor.

Figure 1:
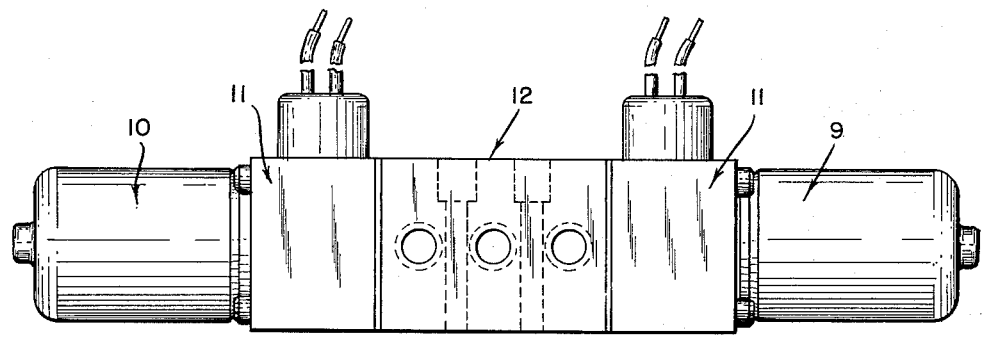
FIGURE 1 is a plan view of one embodiment of the present invention applied as a pilot valve actuator.

Referring to the drawings, in FIGURE 1 the general interrelation at actuating means prime movers 9 and 10, is shown with respect to actuator-valve assembly 11 for coacting upon main control spool valve 12 to fluid drive a servo-motor.

While it can be appreciated that any suitable prime mover for a control valve is comprehended by this invention and whereas any suitable actuator-valve assembly is also contemplated by the instant invention, one of the several preferred combinations is shown in FIGURE 2. Wherein one of the preferred prime movers, solenoid 10, comprises winding 14 partly surrounded by core 15 and housing traveling armature 16, all encased by cap 13. When solenoid 10, preferably a short stroke, fast responsive solenoid, is de-energized armature 16 is spring biased away from core 15 by juxtaposed plunger 17. When solenoid 10 is energized armature 16 is displaced into abutting relation with winding 14 resulting in an equal displacement of plunger 17. Thereafter, upon de-energizing solenoid 10, return spring 27, hereinafter to be described, repositions armature 16 away from core 15 by imposing a force through plunger 17.

FIGURE 2 also shows the described solenoid 10 acting in combination with the preferred actuator-valve assembly. Fundamentally, the displacement of plunger 17, occurring when solenoid 10 is energized, is imparted to resilient actuator assembly 20 through receiving member 22. Receiving member 22 then transmits a portion of the load and displacement of plunger 17 to transmitting member 23 whereby ball 40 is displaced into the position shown in FIGURE 2.

More specifically, referring to FIGURE 5, solenoid 10, for economic reasons, is generally of the low cost type. In order to preserve the solenoid life and prevent early burn-out thereof, plunger 17 must be permitted to travel its full stroke uninterrupted. The full displacement and force of armature 16 are assumed by plunger 17 and directly transmitted to receiving member 22 of resilient actuator assembly 20 through abutting engagement of the end of plunger 17 with the end wall of blind bore 37 concentrically formed in member 22. This displacement and the resulting actuating force is initially transmitted through override spring member 24, to body 25 fixedly secured to transmitting member 23 engaged through its shaft 39 with pilot ball valve 40 effecting unitary bodily movement of receiving member 22, override spring member 24, body 25 and transmitting member 23 relative to cup housing 28 and resulting in compression of return spring 27 until ball 40 sealingly engages seat ring 43 under a predetermined force dictated by the strength of override spring member 24. Thereafter, the displacement and actuating force of armature 16 and plunger 17 is dissipated through compression of spring member 24 and relative sliding movement between receiving member 22 and transmitting member 23 and its associated body 25, the sliding interfit between cylindrical extension 36 of member 23 and the elongated blind bore 38 of transmitting member 23 guiding the relative movement and co-operating with the compression of spring member 24 to dissipate any excess of the armature actuating force over that designed to seat ball 40 on seat ring 43.

Assuming, for illustrative purposes only, that a force of five pounds and a displacement of ⅛ of an inch is required for shaft 39 to seat ball 40 against inner resilient seat ring 43, and that the force and displacement imparted by armature 16 to plunger 17 is 10 pounds and ⅜ of an inch, respectively. The force of 10 pounds and displacement of ⅜ of an inch would be directly imparted to resilient member 24 by receiving member 22. Resilient member 24, through compressive work, would substantially use up the five pounds of force and the ¼ of an inch displacement not required to seat ball 40 to inner resilient ring 43.

When solenoid 10 is thereafter de-energized the force of armature 16 is released and it, plunger 17, receiving member 22, body 25 and transmitting member 23 return to their initial positions with armature 16 abutting the inner end face of cap 13 under influence of return spring 27 and the expansion of override spring member 24. Simultaneously, expansion of spring member 24 restores receiving member 22 to its initial position abutting retainer ring 26 thereby confining the expansive force of spring member 24 to body 25 and establishing the lighter spring force of return spring 27 as the sole armature retaining force.

The preferred pilot valve embodiment is best shown in FIGURE 5. A removable and replaceable pilot valve assembly 21 comprises a one-piece generally cylindrical sleeve-like member 41 having a stepped through bore providing inlet port 45 at its enlarged end and an outlet port 46 at its opposite end and side ports 47, an outer resilient seat ring 42 secured to the outside of the sleeve-like member 41 adapted to sealingly engage with the housing H of a fluid flow system (not shown) first and second spaced apart inner resilient seat rings 43 and 44 disposed in ring grooves formed at the outer end of inlet port 45 and inner end of outlet port 46 of sleeve-like member 41 and a ball 40 dimensioned for assembly through port 45 and movably confined between resilient seat rings 43 and 44 when pilot valve assembly 21 is operatively associated with the main valve to be controlled. The resilient seat ring 43 is freely removable from its ring groove 48 lying in the end face of member 41 allowing ready removal and replacement of ball 40. The diameters of port 46 and ports 47 are smaller than the diameter of ball 40 preventing removal of ball 40 therethrough.

Linear taper 49 at the outer end of port 46 allows shaft 39 of transmitting member 23 to displace ball 40 without restraint by sleeve-like member 41. Hence, it is seen that energizing and de-energizing solenoid 10 effectively locates ball 40 in one of two positions; i.e. either in sealing engagement against resilient seat ring 43 or in sealing engagement with resilient seat ring 44.

Figure 3:
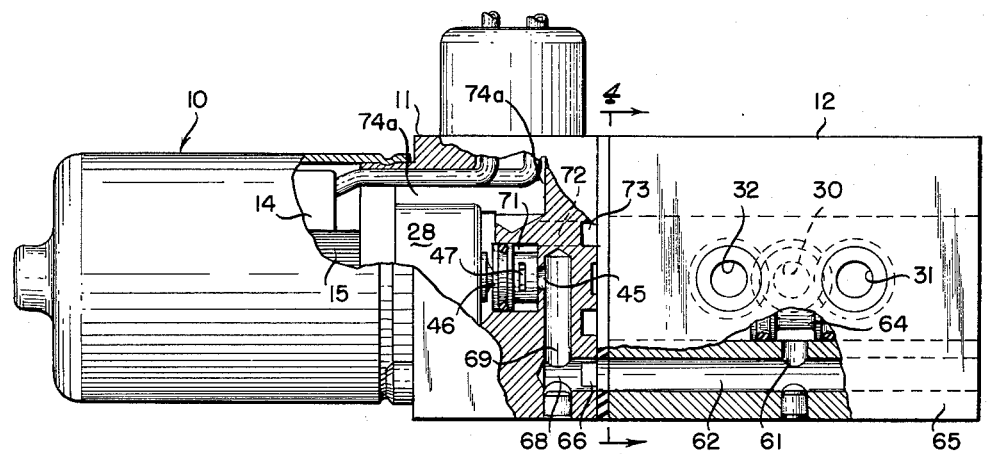
FIGURE 3 is a fragmentary section of the invention shown in FIGURE 2 illustrating the details of the flow path of the fluid.
Figure 4:
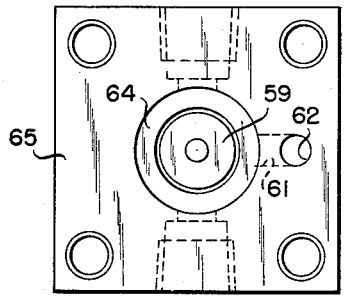
FIGURE 4 shows a sectional view looking along lines 4—4 of FIGURE 3, illustrating the end view of a controlled spool valve.

To appreciate the effect of these two positions of ball 40 in pilot valve assembly 21, consideration is now directed to FIGURES 2, 3 and 4. Spool valve 12 comprises housing 65 sealingly engaging the O-rings of port defining barrel 64 which in turn sealingly engages the O-rings of spool 63. Spool 63 is capable of being displaced within barrel 64 a distance equal to space 67 as in FIGURE 2. Displacement of spool 63 channels the fluid flow through spool valve 12 to actuate a servomotor (not shown) in well known manner. Fluid under pressure from a suitable pressure source (not shown) enters spool valve 12 at inlet port 30. A portion of the fluid flows into annular port 60 and passes through aperture 61 (FIGURE 3) into inlet chamber 62 connected at all times through annular groove 66 and port 68 to chamber 69 in communication with pilot valve inlet port 45. With solenoid 10 de-energized the fluid flows through inlet port 45 of pilot valve assembly 21 and out through side ports 47 into annular chamber 71, along axial bores 72 to annular chamber 73 in constant communication with spool end 59 to exert line pressure thereon. Upon energization of solenoid 10, plunger 17 seats ball 40 on seat ring 43 closing inlet port 45 and venting chamber 71 to exhaust through pilot valve outlet port 46 to the space surrounding cup housing 28 (FIGURE 2) vented to the ambient atmosphere through the passages for the solenoid leads and the port in the end wall of cap 13. As shown in FIGURE 1, a second prime mover, solenoid-actuated pilot valve assembly 9 may be mounted on the opposite end of spool valve 12 to function in precisely the same manner as the solenoid-actuated-pilot valve assembly 10 just described to supply fluid to spool end 58. Therefore, by energizing and de-energizing the two solenoids in correlation, spool 63 of spool valve 12 may be longitudinally alternatively displaced within body member 64. When as shown in FIGURE 1 the solenoid 10 is energized and the solenoid 9 is de-energized, spool 63 will assume the position shown in FIGURE 2 with abutment pins at spool end 59 abutting. Fluid under pressure flowing in inlet port 30 will also flow from port 60 inwardly through passage about spool body portion 76 and out through passages 77 to motor port 31 to one side of a servo-motor (not shown), e.g., a double acting piston within a cylinder, to actuate the motor in one direction. At the same time fluid is returning from the opposite side of the servo-motor through motor port 32, passages 77a about spool body portion 76a, through passages 78a and out exhaust port 33.

If, as shown in FIGURE 1, the solenoid 10 were de-energized and the solenoid 9 were energized, spool 63 would shift longitudinally through space 67 causing the abutment pins at spool end 58 to contact. In this case fluid, under pressure entering inlet port 30 would flow through passages 75, about spool body portion 76a, through passages 77a and out motor port 32 to actuate the servo-motor in the opposite direction. At the same time fluid would be returning from the servo-motor through motor port 31 about spool 63, passages 77, about spool body portion 76, through passages 78 and out exhaust port 34.

FIGURES 6, 7, 8 and 9 illustrate another of the numerous applications in which applicant's novel solenoid controlled pilot valve combination is used as a normally open valve, wherein the described solenoid-actuated-pilot valve assembly 10 is mounted to actuate spool 79.

Mounting may be horizontal, vertical, or at an inclination, depending upon the environment in which it is used. To illustrate how spool valve 79 responds to the flow path of the fluid under pressure will hereafter be described.

Fluid under pressure enters through inlet 80, shown in phantom lines in FIGURE 7, into axial bore 81 divides itself thereafter flowing concurrently downwardly through passage 82 and outwardly from the opposite ends of bore 81 to end chambers 83 and 84 and upwardly through passage 87. The fluid entering passage 87 proceeds into annular chamber 88 in the pilot valve base, through passages 89 and 90 to inlet port 98 of the pilot valve (not shown) but heretofore described in conjunction with FIGURE 5. The fluid under pressure flowing through passage 82 enters directly into annular chamber 94 (FIGURE 6) and passes through port 84 into annular chamber 85 to continuously pressure-bear upon the annular segmental spool face 86.

When solenoid 10 is energized spool 79 occupies the position shown in FIGURE 6, the pilot valve being positioned to connect space 96 through annular space 95, passage 93, annular chamber 92, passage 91 and the pilot valve to exhaust through the solenoid housing thereby relieving the pressure of face 97 and permitting the higher relative pressure acting on spool face 86 to maintain spool 79 in the FIGURE 6 position. In this position shaft 77 displaces the ball of ball assembly 111 into sealing engagement with its resilient seat ring 75. In this position of the spool valve 79, fluid under pressure in chamber 83 flows into the inlet port 99a of ball valve assembly 110, seating the ball valve therein on its seat ring 76, passes through the side ports 100a into annular chamber 101a directly communicating with the motor port 102 to actuate the servo-motor (not shown) in one direction. At the same time, exhaust flow from the other side of the servo-motor (not shown) passes from motor port 103 to annular chamber 101, through side ports 100 of ball valve assembly 111, through the outlet port of ball valve assembly 111 into exhaust chamber E and to exhaust through exhaust port 105.

When solenoid 10 of FIGURE 7 is de-energized, the pilot valve (not shown) shifts to pass pressure fluid from pilot valve inlet port 98 through the pilot valve to passage 91, annular chamber 92, passage 93, annular chamber 95 to space 96 to pressure bear on face 97 of spool valve 79 with the result that the constant but lesser fluid pressure on the annular segmental face 86 of spool valve 79 is overcome and valve 79 shifts to seat the ball of ball valve assembly 110 on its seat ring 75. In this position, the fluid exhausts through motor port 102 annular chamber 101a, ports 100a and the outlet port of ball valve assembly 110 and exhaust port 104 and pressure fluid is applied from chamber 84 to motor port 103 through inlet port 99 of ball valve assembly 111 seating the ball valve therein on its seat ring 76, passes through the side ports 100 into annular chamber 101 directly communicating with the motor port 103 to actuate the servo-motor (not shown) in the opposite direction.

FIGURES 10 and 11 are illustrative of another of the numerous applications of the present invention wherein a main spool valve 119 is controlled by the aforedescribed solenoid-actuated-pilot valve assembly mounted thereon. In this embodiment, the pilot valve assembly 124 is directly seated within spool valve housing 118 and is shown in the position corresponding to the energized condition of the solenoid. Spool valve 119 receives fluid under pressure at inlet port 120. In the illustrated position of the pilot valve assembly 124, pressure fluid from inlet 120 flows through passage 127 to chamber 128 where it divides to pressure bear on ball 126 moving ball 126 to the right and passing outwardly into annular chamber 122a and through motor port 122 to one side of the servo-motor (not shown) to actuate the servo-motor in one direction and also passing through cross passage 140, passage 141, cross passage 142 into chamber 143, port 144 to constantly pressure bear on annular spool face 146. At the same time, motor port 121 is vented to exhaust through passage 130, annular chamber 129, through pilot valve 124 and the solenoid housing. The end space 135 communicating with spool face 136 is vented to exhaust through passage 132 and cross passage 131 to passage 130, annular chamber 129, the pilot valve 124 and the solenoid housing.

Upon de-energization of the solenoid, the inlet pressure fluid in chamber 128 is effective to shift pilot valve ball 124 to permit the inlet pressure to pass through the pilot valve 124, out through annular passage 129 into passage 130 where it divides to admit pressure fluid to the opposite side of the servo-motor through motor port 121 and at the same time to pass through cross passage 131 and passage 132 to end space 135 to pressure bear on the larger area spool face 136 and overcome the lesser opposing pressure on spool face 146 to displace spool 125 to the left causing shaft 139 to seat the ball of ball valve assembly 126 in its left-most position. With spool 125 in this position, the one side of the servo-motor is connected to exhaust through motor port 122, through ball valve assembly 126 and out through exhaust port 123 to effect actuation of the servo-motor in the opposite direction.

FIGURE 12 further illustrates the universal application of the present invention wherein solenoid-actuated-pilot valve assembly is directly mounted to control fluid motor 159, no spool valve being utilized in this embodiment of the invention. Upon de-energization of solenoid 10, fluid under pressure enters at inlet port 160 and proceeds through cross passage 164 to outlet passage 165 where a portion of the fluid flows in one direction into annular chamber 166 and through passages 167 and 168, to the inlet port 162 of pilot valve assembly 161, out the side ports of pilot valve assembly 161 into annular chamber 169, from which it passes through passage 170, annular chamber 172 and passage 173 pressurizing space 174 ahead of piston face 175. A further portion of the fluid under pressure in passage 165 flows in the opposite direction along passage 181 and out port 182 to pressurize space 183 ahead of piston faces 184 and 185.

When the fluid flows as above described, the differential in effective pressure force between space 174 and space 183 causes the piston 163 of fluid motor 159 to be displaced in a leftward direction as shown in FIGURE 12 along cylinder 162. When the solenoid of FIGURE 12 is energized the ball of pilot valve assembly 161 moves to its leftward most seating position preventing additional flow of fluid from passage 168 and vents space 174 to exhaust through passage 173, annular chamber 172, passage 170, annular chamber 169, and out the outlet port 188 of pilot valve assembly 161 to exhaust port 189 to the solenoid structure as heretofore described. At the same time, fluid entering inlet port 160 flows into space 183 to displace piston 163 in a rightward direction as shown in FIGURE 12.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. A mechanism for controlling fluid flow comprising a valve seat, a valve member movable a limited distance toward and away from said seat, and means for displacing said valve member to engage said seat and comprising a housing, a valve actuator having (a) a hollow section slidably mounted in said housing (b) an extension separably abutting said valve member, said actuator being axially displaceable in one direction for urging said valve member toward said seat, said seat limiting the movement of said valve member and said actuator in said one direction, a first spring reacting against a surface in said housing for axially biasing said actuator away from said valve member, a motion transmitting member mounted in said hollow section for limited sliding movement between axially spaced apart positions, a second spring compressed between opposed surfaces on said actuator and said motion transmitting member and having a greater biasing strength than said first spring, said second spring being disposed to bias said motion transmitting member in a direction opposite to said one direction and to bias said actuator in said one direction in opposition to the bias exerted by said first spring, a solenoid having an armature operatively connected to said motion transmitting member, said armature being attractable to unitarily shift said motion transmitting member, said second spring, and said actuator against the bias exerted by said first spring until said valve member engages said seat and to thereafter shift said motion transmitting member relative to said actuator against the bias exerted by said second spring, said hollow section being formed with a cylindrically walled recess coaxially receiving said motion transmitting member, said second spring being coaxially disposed in said recess between the bottom wall thereof and a radial wall formed on said motion transmitting member in opposing relation to said bottom wall, said radial wall being slidable in said cylindrically walled recess.

2. The mechanism defined in claim 1 wherein said first spring coaxially surrounds said hollow section and wherein said armature aligns with said motion transmitting member.

3. The mechanism defined in claim 2 comprising a one-piece generally cylindrical sleeve-like member coaxially receiving said valve member and having inlet and outlet ports, said seat comprising a first ring coaxially mounted in said sleeve-like member adjacent said inlet port, a second seat ring coaxially mounted in said sleeve-like member adjacent said outlet opening in axially spaced apart relation to said first ring, a radial sid port formed in said sleeve-like member axially between said seat rings, said valve member being axially confined between said seat rings to alternately engage said seat rings for allowing fluid to flow through said inlet port and out said side port while preventing fluid flow to said outlet port or for allowing fluid to pass in through said side port and out said outlet port while preventing fluid flow from said inlet port.

References Cited by the Examiner
UNITED STATES PATENTS

| | | | |
|---|---|---|---|
| 2,633,711 | 4/1953 | Torrence | 137—625.27 X |
| 2,812,776 | 11/1957 | Loftus | 137—625.27 |
| 2,952,246 | 9/1960 | Collins | 137—625.64 |
| 2,993,511 | 7/1961 | Johnson | 137—625.64 |
| 3,016,917 | 1/1962 | Hunt | 137—625.27 |
| 3,043,335 | 7/1962 | Hunt | 137—625.5 X |
| 3,092,145 | 6/1963 | Brinkel | 137—625.64 |

MARTIN P. SCHWADRON, *Acting Primary Examiner.*